United States Patent [19]

Lee et al.

[11] 4,354,965

[45] Oct. 19, 1982

[54] POLYETHERAMIDEIMIDE RESINS AND ELECTRICAL CONDUCTORS INSULATED THEREWITH

[75] Inventors: Yue-Guey L. Lee; Otto S. Zamek, both of Schenectady, N.Y.

[73] Assignee: General Electric Company, Schenectady, N.Y.

[21] Appl. No.: 246,039

[22] Filed: Mar. 20, 1981

Related U.S. Application Data

[63] Continuation-in-part of Ser. No. 138,198, Apr. 7, 1980, abandoned.

[51] Int. Cl.$^3$ .............................................. C08G 18/00
[52] U.S. Cl. ................................. 524/104; 427/388.1; 427/409; 428/423.1; 428/423.3; 428/423.7; 528/48; 528/49; 528/52; 528/73; 528/74; 528/179; 528/182; 528/189; 524/233; 524/590; 524/600

[58] Field of Search ...... 260/30.2, 32.6 NT, 32.6 NA, 260/33.6 R; 528/48, 49, 52, 73, 74, 179, 182, 189; 427/388.1, 409; 428/423.1, 423.3, 423.7

[56] References Cited

U.S. PATENT DOCUMENTS

| | | | |
|---|---|---|---|
| 3,541,038 | 11/1970 | Nakano et al. | 260/30.6 |
| 3,817,926 | 6/1974 | Pauze et al. | 260/65 |
| 3,843,587 | 10/1974 | Keating et al. | 528/73 |
| 3,847,867 | 11/1974 | Health et al. | 260/47 |
| 3,983,093 | 9/1976 | Williams et al. | 528/189 |

*Primary Examiner*—Maurice J. Welsh
*Attorney, Agent, or Firm*—Hedman, Casella, Gibson & Costigan

[57] ABSTRACT

Novel high molecular weight resins, useful for electrically insulating conductors, are prepared by polycondensing a mixture of anhydrides, and a diisocyanate and/or a diamine in an inert organic solvent, preferably in the presence of a catalytic amount of 2-methylimidazole.

30 Claims, 1 Drawing Figure

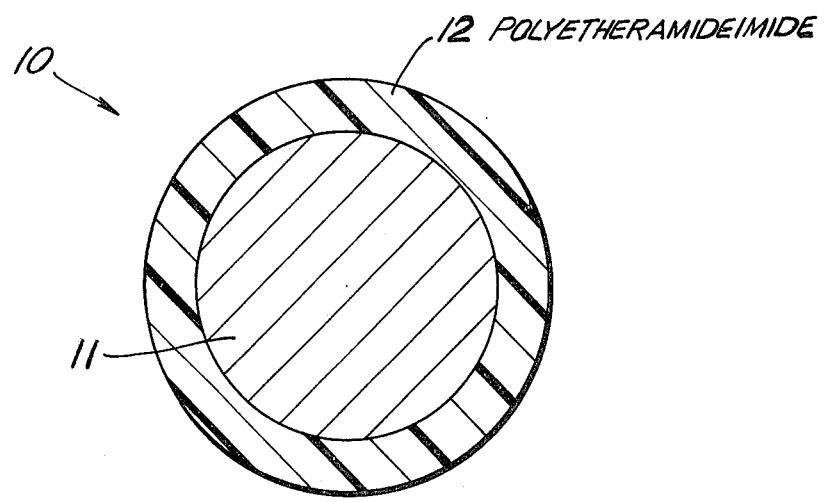

POLYETHERAMIDEIMIDE RESINS AND ELECTRICAL CONDUCTORS INSULATED THEREWITH

This application is a continuation-in-part of copending application Ser. No. 138,198 of the same inventors, filed Apr. 7, 1980 and now abandoned.

The present invention relates to polyetheramideimide resins and to electrical conductors coated therewith. More particularly it relates to polyetheramideimides derived from a combination of a dianhydride of a diphenolic compound and a tribasic acid anhydride and a diisocyanate and/or a diamine.

BACKGROUND OF THE INVENTION

Polyetherimides comprising the reaction products of a dianhydride of a diphenolic compound and a diamine, e.g., methylenedianiline are known to form useful resinous coatings for electrical conductors. See, for example, Heath and Wirth, U.S. Pat. No. 3,847,867. Furthermore, polyamideimides comprising the reaction products of a carboxylic acid anhydride, a diamine and a diisocyanate are known to form useful coatings for electrical conductors. See, for example, Pauze and Holub, U.S. Pat. No. 3,817,926. In addition, polyamideimide resins comprising the reaction products of a tribasic acid anhydride and a diisocyanate are known to form useful insulating coatings from Nakano and Koyama, U.S. Pat. No. 3,541,038. Moreover, it is disclosed in Y. G. L. Lee's copending, commonly filed U.S. patent applicaton Ser. No. 137,991, filed Apr. 7, 1980 now abandoned, assigned to the assignee herein, that useful insulating coatings comprise the polycondensation product of a dianhydride of a diphenolic compound and a diisocyanate. The contents of the foregoing patents and application are incorporated herein by reference.

It has now been discovered that uniquely useful reaction products comprising polyetheramideimide resins can be formed from the reaction of (A) a combination of a dianhydride of a diphenolic compound and a tribasic acid anhydride and (B) a diisocyanate and/or a diamine. Such products are preferred for use as insulating coatings for electrical conductors, e.g., magnet wire and magnet strip, because they are safer, better and more economical. The resins are preferably applied as compositions diluted in an organic solvent.

DESCRIPTION OF THE INVENTION

According to the present invention there are provided high molecular weight polyetheramideimide resins prepared by subjecting (A) a combination of anhydrides comprising:

(i) from 1 to 99 parts by weight of a dianhydride of the formula

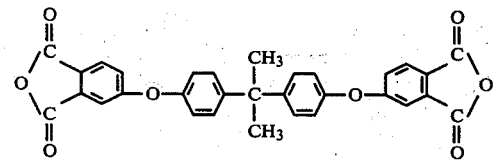

or a mixture thereof with at least one other dianhydride of an organic tetracarboxylic acid, and (ii) from 99 to 1 parts by weight of a tribasic acid anhydride and (B) 0.99 to 1.01 moles, per mole of the anhydride, of a difunctional organic nitrogen compound of the formula (i) O=C=N—R—N=C=O, (ii) H$_2$N—R—NH$_2$, or (iii) a mixture of (i) and (ii) wherein R is divalent alkylene of 2 to 20 carbon atoms,

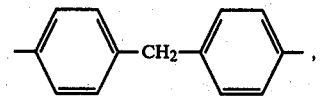

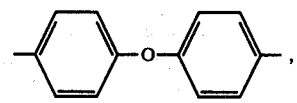

or a mixture thereof, to polycondensation at a temperature of about 60° to 200° C. in the presence of the inert solvent.

It is also contemplated to provide electrical conductors having an insulating coating thereon comprising a resin as above defined.

In preferred features, the resin will be prepared in the presence of a catalytic amount, preferably, from a trace to about 10 mole percent (based on the anhydrides) of 2-methylimidazole. Preferably, the difunctional organic nitrogen compound will be diphenylmethanediisocyanate and/or diaminodiphenylmethane.

The dianhydride component (A)(i), 2,2-bis[4-(3,4-dicarboxyphenoxy)phenyl]propane dianhydride, also known as bisphenol-A dianhydride, is described in the above-mentioned Heath and Wirth, U.S. Pat. No. 3,847,867, and can be made by hydrolyzing, followed by dehydrating, the reaction product of a nitro-substituted phenyl dinitrite with a metal salt of a dihydric aryl compound in the presence of a dipolar aprotic solvent.

The organic diisocyanate and the organic diamines, (B)(i) and (ii) can be prepared in ways known to those skilled in this art, and they are also commercially available.

The term tribasic acid anhydride is used in the art-recognized sense set out in the above-mentioned U.S. Pat. No. 3,817,926 and 3,541,038. In general, it includes aromatic, alicyclic and aliphatic tribasic anhydrides, such as, for example, trimellitic anhydride (which is preferred), hemimellitic anhydride, aconitic anhydride, and the like.

The advantageous properties of the polymers of the invention can be varied by substituting for up to 50 mole percent of the bisphenol-A dianhydride one or more dianhydrides of tetracarboxylic acids, which may be either aromatic dianhydrides or aliphatic dianhydrides, as follows:

The aromatic dianhydrides that are useful in this invention are those having the formula:

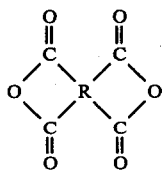

wherein R is a tetravalent radical containing at least one ring of 6 carbon atoms and having benzenoid unsaturation, each pair of carboxyl groups being attached to a different adjacent carbon atoms. These dianhydrides include, for example, pyromellitic dianhydride,
2,3,6,7-naphthalenetetracarboxylic dianhydride,
3,3',4,4'-benzophenonetetracacarboxylic dianhydride,
benzene-1,2,3,4-tetracarboxylic dianhydride,
bis (3,4-dicarboxyphenyl) sulfone dianhydride,
bis (2,3-dicarboxyphenyl) methane dianhydride,
2,6-dichloronapthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
naphthalene-1,4,5,8-tetracarboxylic dianhydride,
naphthalene-1,4,5,8-tetracarboxylic dianhydride,
naphthalene-1,2,4,5-tetracarboxylic dianhydride,
3,3',4,4'-diphenyltetracarboxylic dianhydride,
1,2,5,6-naphthalenetetracarboxylic dianhydride,
2,2',2,2'-diphenyltetracarboxylic dianhydride,
2,2-bis (3,4-dicarboxyphenyl) propane dianhydride,
3,4,9,10-phenylenetetracarboxylic dianhydride,
bis (3,4-dicarboxyphenyl) ether dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl) ethane dianhydride, and the like.

The aliphatic dianhydrides that are useful in this invention are those having the formula:

where R' is a straight-chain or alicyclic tetravalent radical having from 1 to 10 carbon atoms. These dianhydrides include, for example:

methanetetracarboxylic dianhydride,
ethanetetracarboxylic dianhydride,
propanetetracarboxylic dianhydride,
butanetetracarboxylic dianhydride,
hexanetetracarboxylic dianhydride,
cyclohexanetetracarboxylic dianhydride, and the like.

The polymers are prepared from the reaction of mixed bisphenol-A dianhydride (BPA-DA) and, e.g., trimellitic anhydride and diphenylmethane diisocyanate (MDI), diphenyletherdiisocyanate, methylenedianiline (MDA), diaminodiphenyl ether, or a mixture of any of the foregoing, in the presence or absence of 2-methylimidazole (2-MeIM) catalyst, in an organic solvent, such as N-methylpyrrolidone (NMP), dimethylacetamide (DMAC), an aromatic hydrocarbon, e.g., of 6 to 40 carbon atoms, e.g., xylene, or a proprietary aromatic hydrocarbon solvent, e.g., Solvesso 100, or in mixtures thereof, such as NMP-DMAC, NMP-xylene, NMP-DMAC-xylene or Solvesso 100, etc.

One typical reaction pathway is as follows:

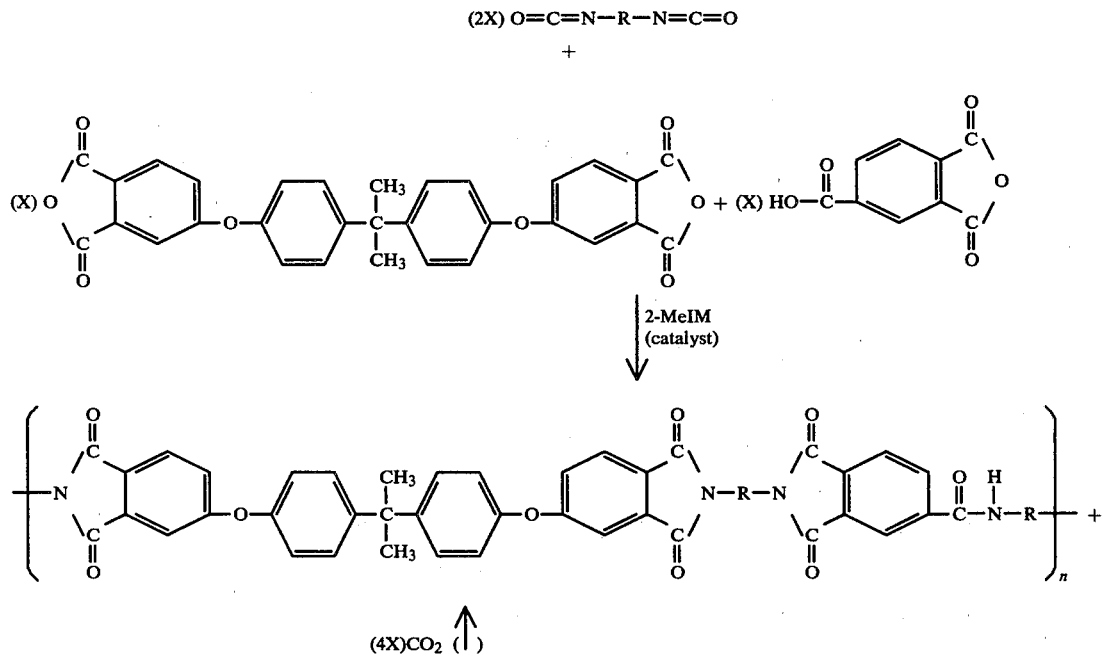

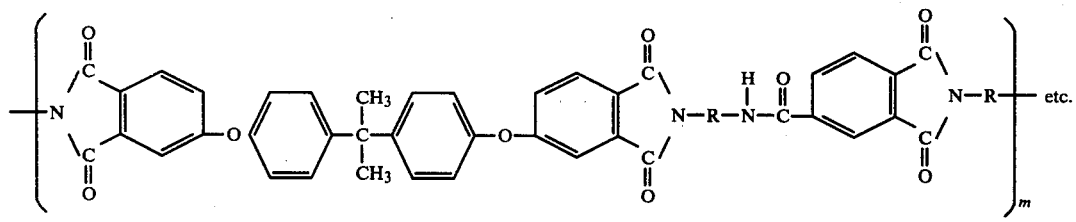

wherein R = [structures shown], or a mixture thereof.

Another typical reaction pathway is as follows:

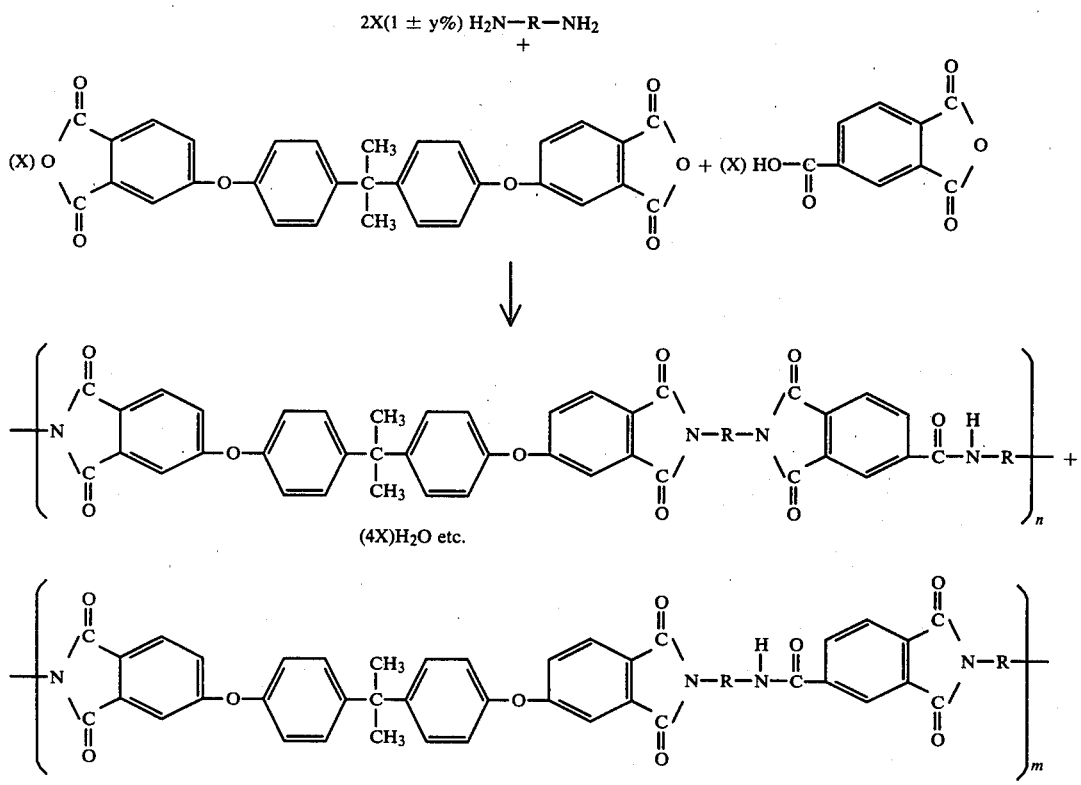

where R is as defined above.

The resulting resins can be random copolymers or random block copolymers.

The optimum mole ratio of MDI or MDA, BPA-DA and TMA (trimellitic anhydride) is (1.98–2.02):1.00:1.00 and the catalyst is 0–10 mole %, based on the mixed anhydrides. To make a coating composition the resin can be prepared in the organic solvent, e.g., NMP, NMP-DMAC, NMP-XYLENE or Solvesso 100, etc., or the resin can be isolated, then redissolved in such solvents, or in methylene chloride, dimethyl formamide, cresylic acid, phenol, and the like.

Conventional preparative methods are used. See, for example, the above-mentioned U.S. Pat. No. 3,541,038, which sets forth reaction times, temperatures, etc.

In one manner of proceeding, the BPA-DA and TMA are reacted with MDI (or MDA) in the presence of a mixture of N-methylpyrrolidone and the organic liquid hydrocarbon Solvesso 100 at a temperature of 135° C. for about 5 hours. During the first period of reaction, the carbon dioxide (or water) is continuously evolved. Later, the solution gradually increases in viscosity and by-product ($CO_2$ or water, as the case may be) evolution substantially ceases. A suitable termination point is a Gardner viscosity of Z2. Such an enamel can be used as a sole coat on a wire conductor or it can be used as a top coat over a polyester or polyesterimide base coat.

In accord with conventional practices, other additives may be formulated into the compositions, such as, without limitation, minor proportions of aliphatic amino compounds, conventional phenolic resins, titanate esters, blocked polyisocyanates, and the like.

BRIEF DESCRIPTION OF THE DRAWING

In the drawing, the figure shows a section of magnet wire made according to this invention.

DESCRIPTION OF THE PREFERRED EMBODIMENT

In the figure a magnet wire indicated generally by the numeral 10 and has a conductor 11 covered with a layer 12 of a resinous polyetheramideimide of bisphenol-A dianhydride and trimellitic anhydride and a diisocyanate and/or a diamine. Although the drawing illustrates a conductor 11 that is circular in section, it will be understood that the square or rectangular conductors in the form of strips or foils may also be used without departing from the invention.

A suitable polyetheramideimide for layer 12 can be made following Examples 1-5.

EXAMPLE 1

On mole (520 g.) of 2,2-bis[4-(3,4-dicarboxyphenoxy)-phenyl]propane, 1 mole (192 g.) of trimellitic anhydride, 2 mole (500 g.) of methylenediisocyanate, 0.1 mole (8.2 g.) of 2-methylimidazole, 1300.9 g. of N-methylpyrrolidone and 565.6 g. of aromatic hydrocarbon solvent (Solvesso 100) are added to a five liter, three neck, round bottomed flask equipped with a stirrer, thermometer, condenser, and a nitrogen inlet. The mixture is heated from room temperature to 135° C. in approximately two hours and held at 135° C. for 3.25 hours until a Gardner viscosity of Z2 is obtained. In this reaction, the solution changes from yellow, orange to clear red and clear dark red during the first two hours of heating, and carbon dioxide is nearly completely removed after 1½ hour reaction at 135° C. Thereafter, the solution viscosity gradually increases with continued very minor evolution of $CO_2$. The solids content is about 40% in the organic solvent, and the composition can be used as an electrical conductor coating composition. If desired, the resin from this, and the other examples, can be isolated by pouring the cooled reaction mixture into methanol to precipitate the polymer.

Although diphenylmethanediisocyanate is shown, it can be partially a completely replaced by diphenylether diisocyanate. Moreover, the catalyst can be omitted.

The composition is further diluted with a mixture of 4 parts of NMP to 1.74 parts of Solvesso 100 and coating compositions containing 36 and 37% of solids are also obtained.

The composition of Example 1 (40% solids) is applied to 0.0403" copper wire as a sole coat in a commercial wire tower. A build of 2.8-3.3 mils is obtained. The following properties are observed:

| Speed (ft./min.) | 40 | 45 | 50 |
|---|---|---|---|
| Flexibility 25+ | 1X | 1X | 1X |
| | 1X* | 1X* | |
| Heat Shock-20%-30'-260° C. | 2X | 1X | not determined |
| | 1X* | 2X* | |
| Cut Through Temperature, °C. at 2000 g. | 378 | 376 | not determined |
| | 415* | 403* | |

*Values after deposition from 32% solids composition applied as a topcoat over polyester (ISONEL 678).

Excellent quality coated conductors are obtained.

The composition of Example 1 is applied to 0.0403 copper wire as an overcoat over an ethylene glycol-tris(2-hydroxyethyl)isocyanate-terephthalate undercoat (Schenectady Chemical's ISONEL 678). A final build of 2.9 to 3.1 is obtained. The following properties are observed from 40% solids as a topcoat:

| Speed (ft./min.) | 40 | 45 |
|---|---|---|
| Flexibility 25+ | 1X | 1X |
| Heat Shock-20%-30'-260° C. | 1X | 1X |
| Cut Through Temperatures, °C. at 2000 g. | 407 | 412 |

Excellent coated conductors are obtained.

EXAMPLE 2

The general procedure of Example 1 is repeated with 416g. (0.8 mole) of 2,2-bis[4-(3,4-dicarboxyphenoxy)-phenyl]propane, 307.4 g. (1.6 moles) of trimelletic anhydride, 606 g. (2.42 moles) of diphenylmethane diisocyanate 9.84 g. (0.12 mole) of 2-methylimidazole, 1098.8 g. of N-methylpyrrolidone and 477.7 g. of xylene. The viscosity after 1 hour is 8970 centistokes. The resin composition is cut with 293.6 g. of NMP and 127.7 g. of xylene. The heating is continued for 0.5 hour (viscosity 3390 centistokes). At room temperature, the viscosity is 3530 centistokes. Heating at 135° C. is resumed for 2 hours and 15 minutes. Final viscosity is Gardner Z3+. Solids content is 35.78% average.

The composition of Example 2 is applied to 0.0403" copper wire as a sole coat in a commercial wire tower. A build of 2.8-3.3 mils. is obtained. The following properties are observed:

| Speed (ft./min.) | 35 |
|---|---|
| Flexibility 25+ | 2X |
| Heat Shock-20%-30'-260° C. | 3X |
| Cut Through Temperature, °C. at 2000 g. | 474 |

The composition of Example 2 is applied to 0.0403 copper wire as an overcoat over an ethylene glycol-tris (2-hydroxyethyl)isocyanate terephthalate undercoat (Schenectady Chemical's ISONEL 678). A final build of 2.9-3.2 mils. is obtained. The following properties are observed:

| Speed (ft./min.) | 40 | 45 |
|---|---|---|
| Flexibility 25+ | 1X | 1X |
| Heat Shock-20%-30'-260° C. | 1X | 1X |
| Cut Through Temperature, °C. at 2000 g. | 420 | 410 |

Excellent coated conductors are obtained.

EXAMPLE 3

Following the general procedure of Example 1, a polyetheramideimide is made using methylenedianiline (MDA) instead of diphenylmethanediisocyanate (MDI). There are used 520 g. (1 mole) of 2,2-bis[4-(3,4-dicarboxyphenoxy)phenyl]propane dianhydride, 192 g. (1 mole) of trimellitic anhydride, 400.5 g. (2.02 mole) of MDA, 1277 g. of N-methyl pyrrolidone and 555.6 g. of aromatic hydrocarbon (Solvesso 100). No 2-methylimidazole is used. The temperature reaches 180° C. during heating. When 70.5 mls. of water has been collected, the very viscous reaction mixture is filtered. The very viscous liquid is 40% solids. Seven hundred grams of the viscous composition is mixed with 97 g. of N-methylpyrrolidone and 44.7 g. of Solvesso 100 hydrocarbon solvent to produce a resin composition suitable for coating electrical conductors.

EXAMPLE 4

Following the general procedure of Example 1, a polyetheramideimide is prepared, substituting 20 mole percent of the 2,2 bis[4-(3,4-dicarboxyphenoxy)phenyl]-propane (BPA-DA) with benzophenonetetracarboxylic dianhydride (BTDA). There are used 416 g. (0.8 mole) of BPA, 64.45 g. (0.2 mole) of BTDA, 192 g. (1 mole) of trimellitic anhydride, 505 g. (2.02 moles) of MDI, 1278 g. of NMP, 556 g. of Solvesso 100, and 8.2 g. (0.1 mole) 2-methylimidazole. The temperature never exceeds 135° C., and after 3 hours a viscosity of Gardner Z3½ (about 1760 centistokes) is obtained. Part of this composition is cut with a solvent mixture, 80 g. NMP and 35 g. Solvesso 100, then mixed at room temperature for two hours. Final viscosity is Gardner Z2. Solids content is 36.9%. This composition is labeled A.

The remaining portion is further reacted at 135° C. until a Gardner viscosity of Z5 is reached. This is cut with a solvent mixture, 200 g. NMP and 87 g. Solvesso 100 to obtain a Gardner viscosity of Z¾ and a solids content of 33.25%. This composition is labeled B.

Both enamels are applied to 0.0403" copper wire as a sole coat in a commercial wire tower. In both cases a build of 2.9–3.1 mils are obtained. The following properties were observed:

| Speed (ft./min.) | 40 | 45 | 50 |
|---|---|---|---|
| Enamel A | | | |
| Flexibility (25%+) | 3X | 2X | 1X |
| Dissipation Factor (260° C.) | 5.0 | 12.3 | 14.7 |
| Heat Shock (20%-30 min. at 240° C.) | 1X | 2X | 2X |
| Cut Thru (°C. at 2000 g) | 403 | 444 | 374 |
| Dielectric Strength (KV) | 12.1 | 9.9 | 9.2 |
| Enamel B | | | |
| Flexibility (25%+) | 1X | 1X | 1X |
| Dissipation Factor (260° C.) | 7.5 | 12.0 | 13.1 |
| Heat Shock 20%-30 min. at 240° C.) | 1X | 1X | 1X |
| Cut Thru (°C. at 2000 g) | 471 | 403 | 394 |
| Dielectric Strength (KV) | 9.3 | 9.7 | 11.9 |

EXAMPLE 5

The general procedure of Example 4 is repeated, except that 20 mole percent of the 2,2 bis[4-(3,4-dicarboxyphen oxy)phenyl]propane (BPA-DA) is replaced with pyromellitic dianhydride (PMDA) instead of benzophenonetetracarboxylic dianhydride. 43.6 g. (0.2 mole) of the PMDA are used; all other amounts are the same as in Example 4. The final enamels obtained, labeled A' and B', had respective Gardner viscosities of Z1½ and Z1, and had respective solids contents of 38.5% and 32.2%.

These enamels were also applied to 0.0403" copper wire as a sole coat in a commercial wire tower to builds of 2.9–3.1 mils. The following properties were observed:

| Speed (ft./min.) | 40 | 45 | 50 |
|---|---|---|---|
| Enamel A' | | | |
| Flexibility (25%+) | 1X | 1X | 1X |
| Dissipation Factor (260° C.) | 9.5 | 10.9 | 11.6 |
| Heat Shock (20%-30 min. at 240° C.) | 1X | 1X | 1X |
| Cut Thru (°C. at 2000 g) | 461 | 422 | 395 |
| Dielectric Strength (KV) | 12.4 | 12.9 | 10.4 |
| Enamel B' | | | |

| Speed (ft./min.) | 40 | 45 | 50 |
|---|---|---|---|
| Flexibility (25%+) | 1X | 1X | 1X |
| Dissipation Factor (260° C.) | 7.5 | 9.0 | 13.3 |
| Heat Shock (20%-30 min. at 240° C.) | 1X | 1X | 1X |
| Cut Thru (°C. at 2000 g) | 463 | 436 | 384 |
| Dielectric Strength (KV) | 9.7 | 9.9 | 12.2 |

Many variations will suggest themselves to those skilled in this art in light of the above-detailed description. All such modifications are within the full intended scope of the appended claims.

We claim:

1. A high molecular weight polyetheramideimide resin prepared by subjecting
   (A) a combination of anhydrides comprising:
   (i) from 1 to 99 parts by weight of a dianhydride of the formula

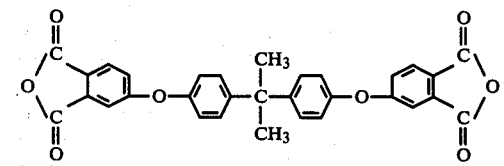

or a mixture thereof with at least one other dianhydride of an organic tetracarboxylic acid, and
   (ii) from 99 to 1 parts by weight of a tribasic acid anhydride, and
   (B) 0.99 to 1.01 moles, per mole of the anhydride, of a difunctional organic nitrogen compound of the formula
   (i) O=C=N—R—N=C=O,
   (ii) H$_2$N—R—NH$_2$, or
   (iii) a mixture of (i) and (ii), wherein
   R is divalent alkylene of 2 to 20 carbon atoms,

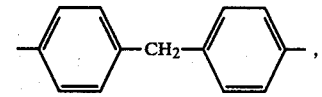

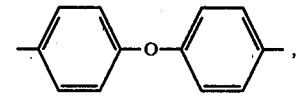

or a mixture thereof, to polycondensation at a temperature of about 60° to 200° C. in the presence of an inert solvent.

2. A polyetheramideimide resin as defined in claim 1 wherein polycondensation is carried out in the presence of a catalytic amount of 2-methylimidazole.

3. A polyetheramideimide resin as defined in claim 2 wherein the amount of 2-methylimidazole comprises from trace amounts up to about 10 mole percent, based on anhydride component (A).

4. A polyetheramideimide as defined in claim 1 wherein, in Component (A), (i) comprises from 40 to 60 parts by weight, and (ii) comprises from 60 to 40 parts by weight.

5. A polyetheramideimide resin as defined in claim 1 wherein, in difunctional component (B)(i), R is

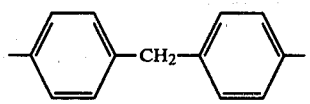

6. A polyetheramideimide resin as defined in claim 1 wherein, in difunctional component (B)(ii), R is

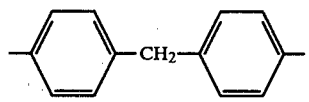

7. A polyetheramideimide resin as defined in claim 1 wherein the inert solvent comprises N-methylpyrrolidone, dimethylacetamide, an aromatic hydrocarbon, or a mixture of any of the foregoing.

8. A polyetheramideimide resin as defined in claim 1 wherein in component (A)(i), the other dianhydride is benzophenonetetracarboxylic dianhydride.

9. A polyetheramideimide as defined in claim 1 wherein in component (A)(i), the other dianhydride is pyromellitic dianhydride.

10. An electrical conductor having an insulating resin coating thereon, said resin being as defined in claim 1.

11. An electrical conductor having an insulating resin coating thereon, said resin being as defined in claim 5.

12. An electrical conductor having an insulating resin coating thereon, said resin being as defined in claim 6.

13. A coating composition comprising a polyetheramideimide resin dissolved in an organic solvent, said polyetheramideimide resin being as defined in claim 1.

14. A coating composition as defined in claim 13, said organic solvent being selected from N-methylpyrrolidone, dimethylacetamide, an aromatic hydrocarbon, or a mixture of any of the foregoing.

15. An electrical conductor having an insulating resin coating thereon, said coating solely consisting of a resin as defined in claim 1.

16. An electrical conductor having an insulating resin coating thereon, said coating consisting of a base coat of a polyester or polyesterimide and an overcoat of a resin as defined in claim 1.

17. A high molecular weight polyetheramideimde resin prepared by subjecting (A) a combination of anhydrides comprising:
(i) from 1 to 99 parts by weight of a dianhydride of the formula

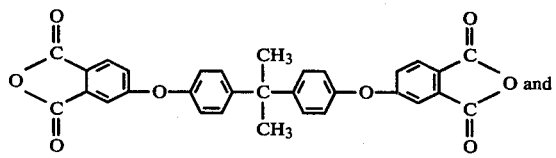

(ii) from 99 to 1 parts by weight of a tribasic acid anhydride and (B) 0.99 to 1.01 moles, per mole of the anhydride, of a difunctional organic nitrogen compound of the formula
(i) O═C═N—R—N═C═O,
(ii) H₂N—R—NH₂, or
(iii) a mixture of (1) and (ii), wherein R is

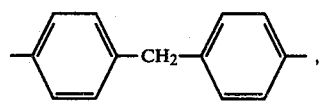

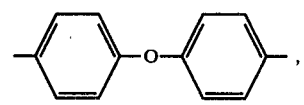

or a mixture thereof, to polycondensation at a temperature of about 60° to 200° C. in the presence of an inert solvent.

18. A polyetheramideimide resin as defined in claim 17 wherein polycondensation is carried out in the presence of a catalytic amount of 2-methylimidazole.

19. A polyetherimide resin as defined in claim 18 wherein the amount of 2-methylimidazole comprises from trace amounts up to about 10 mole percent based on anhydride component (A).

20. A polyetheramideimide as defined in claim 17 wherein, component (A), (i) comprises from 40 to 60 parts by weight, and (ii) comprises from 60 to 40 parts by weight.

21. A polyetheramideimide resin as defined in claim 17 wherein, in difunctional component (B) (i), R is

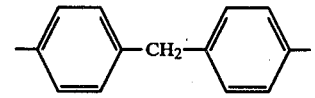

22. A polyetheramideimide resin as defined in claim 17, wherein, in difunctional component (B) (ii), R is

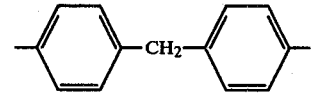

23. A polyetheramideimide resin as defined in claim 17 wherein the inert solvent comprises N-methylpyrrolidone, dimethylacetamide, an aromatic hydrocarbon, or a mixture of any of the foregoing.

24. An electrical conductor having an insulating resin coating thereon, said resin being as defined in claim 17.

25. An electrical conductor having an insulating resin coating thereon, said resin being as defined in claim 21.

26. An electrical conductor having an insulating resin coating thereon, said resin being as defined in claim 22.

27. A coating composition comprising a polyetheramideimide resin dissolved in an organic solvent, said polyetheramideimide resin being as defined in claim 17.

28. A coating composition as defined in claim 27, said organic solvent being selected from N-methylpyrrolidone, dimethylacetamide, an aromatic hydrocarbon, or a mixture of any of the foregoing.

29. An electrical conductor having an insulating resin coating thereon, said coating solely consisting of a resin as defined in claim 17.

30. An electrical conductor having an insulating resin coating thereon, said coating consisting of a base coat of a polyester or polyesterimide and an overcoat of a resin as defined in claim 17.

* * * * *